United States Patent [19]

Riffee et al.

[11] 3,985,293

[45] Oct. 12, 1976

[54] MACHINE READABLE MERCHANDISE MARKING TAG

[75] Inventors: Lyle G. Riffee; William R. Horst, both of Dayton, Ohio

[73] Assignee: NCR Corporation, Dayton, Ohio

[22] Filed: Nov. 4, 1974

[21] Appl. No.: 520,827

[52] U.S. Cl. ........................................ 235/61.12 N
[51] Int. Cl.² ........................................ G06K 19/06
[58] Field of Search .................. 250/568, 569, 570; 340/143.6 Y, 146.3 K, 173 LT; 235/61.11 E, 61.11 D, 61.11 R, 61.12 R, 61.12 N; 40/2.2

[56] References Cited
UNITED STATES PATENTS

| | | | |
|---|---|---|---|
| 2,612,994 | 10/1952 | Woodland | 235/61.11 E |
| 3,409,760 | 11/1968 | Hamisch | 235/61.12 N |
| 3,513,320 | 5/1970 | Weldon | 250/569 |
| 3,549,897 | 12/1970 | Blake | 235/61.12 N |
| 3,622,758 | 11/1971 | Schanne | 235/61.11 E |
| 3,752,961 | 8/1973 | Torrey | 235/61.11 E |
| 3,757,090 | 9/1973 | Haefeli | 235/61.12 N |

*Primary Examiner*—Daryl W. Cook
*Assistant Examiner*—Robert M. Kilgore
*Attorney, Agent, or Firm*—J. T. Cavender; Albert L. Sessler, Jr.; Edward Dugas

[57] ABSTRACT

The code and record medium of the present invention is comprised of a plurality of code marks which are positioned around the periphery of one or more circles in a predetermined sequence, on a record member, for merchandise marking or other appropriate use. One or more of the code marks can be designated to be a marker for an orientation of the code sequence. A machine can read the code marks by scanning the code marks with a light beam, or other suitable scanner, as an associated article of merchandise, for example, is moved transversely across the scan path of the beam. Light reflections from the code marks are detected and converted into corresponding electrical signals. The electrical signals are then compared against known valid signals to eliminate false signals not corresponding to known code marks. Valid signals may be serially fed to a shift register which shift register, upon receipt of all valid signals corresponding to the reading of one plurality of code marks, end-around shifts the received signals to align the marker signal in a predetermined location in the shift register thereby placing all of the received signals in sequence regardless of the angular orientation of the circularly positioned plurality of code marks with respect to the scan beam.

12 Claims, 11 Drawing Figures

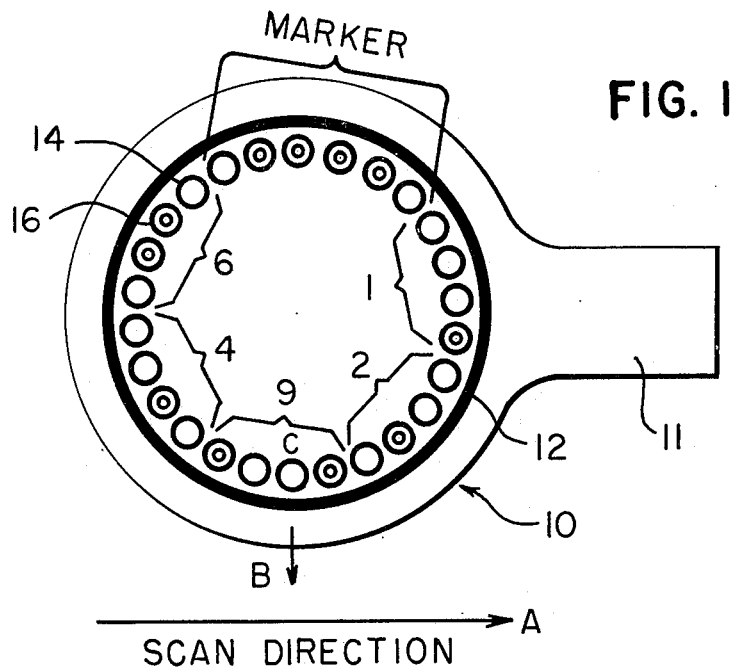
FIG. 1
FIG. 2
| CODE | |
|---|---|
| DIGIT | BINARY |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |
| 0 | 1 0 1 0 |
| MARKER CODE | 0 1 1 1 0 |
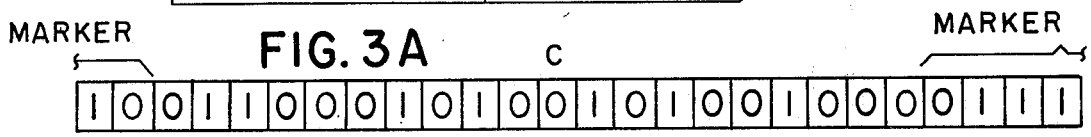
FIG. 3A
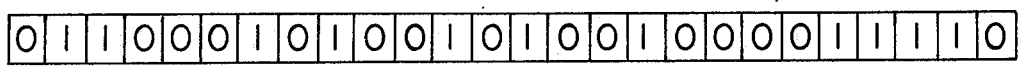
FIG. 3B

| DIGIT | CODE | |
|---|---|---|
| 0 | 1 0 0 0 1 0 | 0 1 0 0 0 1 |
| 1 | 1 0 0 1 0 0 | 0 0 1 0 0 1 |
| 2 | 1 0 0 1 0 1 | 1 0 1 0 0 1 |
| 3 | 1 0 0 1 1 0 | 0 1 1 0 0 1 |
| 4 | 1 0 1 0 0 1 | 1 0 0 1 0 1 |
| 5 | 1 0 1 0 1 0 | 0 1 0 1 0 1 |
| 6 | 1 0 1 0 1 1 | 1 1 0 1 0 1 |
| 7 | 1 0 1 1 0 0 | 0 0 1 1 0 1 |
| 8 | 1 0 1 1 0 1 | 1 0 1 1 0 1 |
| 9 | 1 0 1 1 1 0 | 0 1 1 1 0 1 |
| MARKER | 1 0 1 1 1 1 | 1 1 1 1 0 1 |

| 1 | 0 | MARKER | 9 | 8 | 7 | 6 | 5 | 4 | 3 | 3 | 2 |

| 9 | 8 | 7 | 6 | 5 | 4 | 3 | 3 | 2 | 1 | 0 | MARKER |

MACHINE READABLE MERCHANDISE MARKING TAG

BACKGROUND OF THE INVENTION

This invention relates to machine readable record members, such as merchandise marking tags and the use of codes thereon. Marking tags using concentric rings, of, for example, light-reflective and non-reflective areas have been used to encode information such as price and inventory control numbers for merchandise.

As more use is made of this type of marking tag the demand for additional information to be recorded on the tags also increases. The most obvious way to increase the information carrying capability of the tag is to add additional rings to those already there. The size of this tag then increases by at least one ring width for each additional digit of information.

One prior art marking tag that is of interest is disclosed in U.S. Pat. No. 2,612,994 entitled "Classifying Apparatus and Method," by N. J. Woodland et al. The tag is disclosed in FIG. 10 of the patent consisting of concentric circular rings of particular line colors and/or particular line position. Coding of the tag is accomplished by selecting the desired rings of colors and/or by varying the line positions of the selected rings.

As mentioned above the obvious way of carrying more information with this type tag is to increase the number of rings of reflective material.

Another prior art tag of interest is disclosed in U.S. Pat. No. 3,671,722 entitled, "Transition Code Recognition System," by J. B. Christie, which patent is assigned to NCR Corporation, the assignee of the present application, and wherein a rectangular tag having bars of color is used. In order to increase the amount of information carried by this type of tag the length of the tag has to be increased proportionately by the amount of added information.

From the foregoing it can be concluded that a need exists for a record medium, such as a marking tag, with increased data recording capability. In addition the record medium should have the capability of being easily and economically coded by merchants and lend itself to small batch handling. The tags presently in use have to be printed in large quantities in order to minimize the cost per tag, but in addition a large number of differently coded tags must be kept in stock to cover the many different prices assigned to pieces of merchandise. The printing process requires complex and expensive code printing machinery, which means that small businesses must purchase the labels already coded. The record medium of the present invention, aside from carrying large quantities of data, also lends itself to merchant coding with relatively inexpensive code printing devices. It should be noted that the present invention is in no way limited to merchandise marking tags, since it is also suitable for other uses.

SUMMARY OF THE INVENTION

In the present invention, a machine readable record medium having increased information carrying capability is formed by providing a record member such as a merchandise tag with a plurality of individual circular code marks, with the centers of the marks lying on the circumference of at least one common circle. One of the plurality of code marks may be uniquely coded as a marker to provide an index for determining the position sequence for the remainder of the plurality of code marks. If desired, the pattern of code marks may be directly applied to a carton which contains the article of merchandise.

An optical system can be used to scan the code marks and to convert the optical images received from such a scan into electrical signals. The angular orientation of the code marks can be random in the plane of scan. A comparing means may be utilized to compare the electrical signals from the optical system against known valid signals, for rejecting or accepting the provided signals if they are not valid or valid, respectively. A shift register could be used to sequentially receive the accepted signals and to store the signals at individual locations within the shift register. The shift register, upon receipt of the entire signal corresponding to a scanning of the code pattern, could then be controlled to end-around shift so as to place the electrical signal corresponding to the marker code in a predetermined location within the shift register which in turn would place all of the signals in sequence with respect to the location of the marker code. A utilization means would then be used to receive the signals from the shift register and to convert the signals into, for example, a visual readout.

From the foregoing it can be seen that it is a primary object of the present invention to provide an improved machine readable record medium for storing data.

It is another object of the present invention to provide an improved record medium for storing data, such as a marking tag, having an increased code carrying capability.

It is a further object of the present invention to provide a novel record medium, such as a marking tag, wherein the angular orientation of the marking tag with respect to the read system is not critical.

It is still another object of the present invention to provide a record medium, such as a marking tag, which can be readily coded by the user.

It is still a further object of the present invention to provide a circularly oriented code pattern which may be read with linear scanners regardless of the angular orientation of the item containing the pattern.

These and other objects of the present invention will become more apparent when taken in conjunction with the following description and drawings wherein like characters indicate like parts and which drawings form a part of the present invention.

BRIEF DESCRIPTION OF THE DRAWINGS

FIG. 1 illustrates one embodiment of the present invention;

FIG. 2 illustrates in chart form the coding of the embodiment of FIG. 1;

FIGS. 3a and 3b illustrate one possible readout of the code contained on the FIG. 1 embodiment;

DESCRIPTION OF THE PREFERRED EMBODIMENT OF THE INVENTION

Figures 4, 5, 6A, 6B:
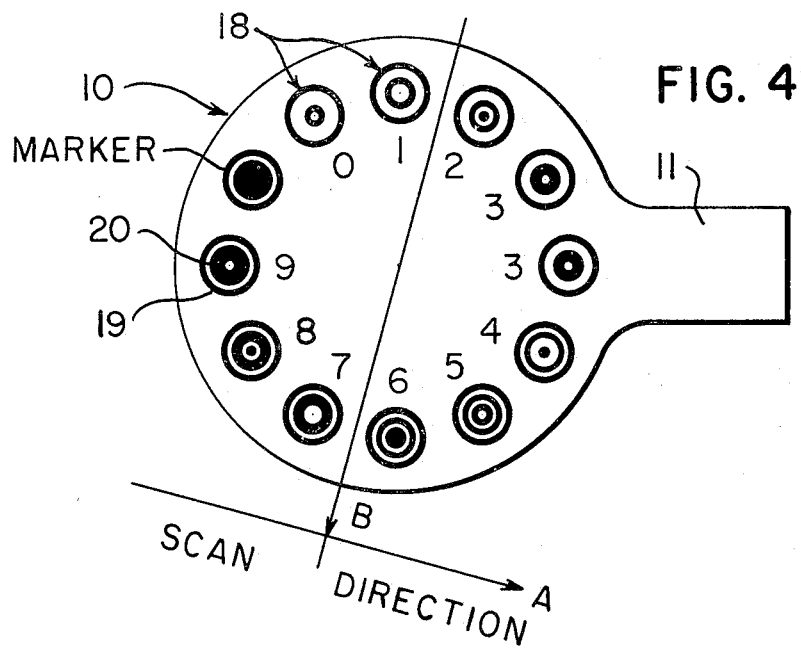
FIG. 4 illustrates a second preferred embodiment of the present invention.
FIG. 5 illustrates in chart form the coding of the embodiment of FIG. 4.
FIGS. 6a and 6b illustrate one possible readout of the code contained on the FIG. 4 embodiment.

In FIG. 1 there is shown one preferred embodiment of a machine readable marking code which may be printed or affixed to a tag 10 made of a suitable sheet material such as, for example, paper, plastic or metal. If desired the marking code may be directly affixed to an article of merchandise. Printed on the marking tag 10 is a dark ring 12. Ring 12 is a clocking ring which defines the beginning and the end of one scan across the tag. Within the clocking ring there are printed a plurality of circular binary code marks as exemplified by marks 14 and 16. The code mark 14 represents a "zero" and the code mark 16 represents a "one," that is each code mark represents a bit of data. Digit numbers are represented in binary form on the tag by using a group of four adjacent code marks in accordance with the binary code chart set forth in FIG. 2. For example, reading the code marks clockwise from the marker group the digit 1 is represented by the binary code 0001. The digits 1, 2, 9, 4 and 6 are shown encoded on the tag, as an example only, with the understanding that any sequence of random digits could be encoded on the tag to represent merchandising information. Also bit codes, other than four bits, could be used as well to encode the tag. The code marker should be uniquely coded to set it apart from the remaining code marks. In the embodiment shown this is accomplished by providing a symmetrical group of marks which group contains two more marks than a normal digit group. The marker is symmetrically coded in that it reads the same whether read clockwise or counter-clockwise.

To read the marking code pattern on the tag, the tag is moved along a direction B by means of a human operator or by a machine means such as a conveyer belt. The angular orientation of the tag about its center will be random. As the tag moves in the direction B it is repeatedly scanned along the scan direction A shown by the action arrow. The width of the scan beam should be approximately as wide as the width of one ring portion of the code marks. The scanning rate should be such that all portions of the marking code will be scanned at least once when the marking code is passed by the scan beam.

In reading out the code the first binary code sensed by the scanner is placed into the center bit location of an end around type shift register. All codes thereafter which are sensed left of the first sensed binary code are entered into adjacent positions left of the first sensed binary code and all of those codes which are sensed to the right of the first sensed binary code are entered into adjacent positions to the right of the first sensed binary code. FIG. 3a illustrates the bit position within an end around shift register that the marking codes of FIG. 1 marking tag would take when the binary code marked C is the first to be sensed. The shift register is then end around shifted to place the marker code in the extreme right bit positions of the shift register. All of the binary codes will now be in a readable position within the shift register. This is illustrated in FIG. 3b. Although only one system is discussed for reading out the merchandising tag it will be obvious to those persons skilled in the art that other systems could also be used effectively.

The tag is shown as being light in color with the printed code being dark. The reverse is also possible; that is, the tag could be dark with the printing being light. The tag is provided with a projection 11 to facilitate operator handling.

Referring now to FIG. 4, a second embodiment of the marking tag 10 is shown having a plurality of code marks 18 positioned in a circular geometry. Each of the code marks is comprised of a plurality of concentric circular rings of contrasting reflectivity positioned side-by-side. Unlike the marking tag of FIG. 1 the clocking ring 12 which enclosed all of the code markers is not used. In its place each of the code marks 18 commence the pattern with a dark ring 19 followed by a light ring 20. Each of the code marks is identified by its associative digit, which digit may be also printed on the tag to provide a quick visual readout of the code. In the first embodiment discussed each code mark represented a bit of data; in the present embodiment each code mark represents a character. The reading of the marking tag of FIG. 4 can be accomplished in the same manner as the reading of the tag of FIG. 1.

The digit code chart of FIG. 5 illustrates the encoding of the code marks 18. A dark ring corresponds to the digit one and a light ring to the digit zero.

For a scan direction A and a tag movement direction B, the digit code positions, with an end around shift register, will be as shown in FIG. 6a. The digit 7 code will be left of center with the digit 6 code being right of center. End around shifting of the contents of the shift register to place the marker into the least significant bit position will result in the digit code position within the shift register illustrated in FIG. 6b.

Figure 7:
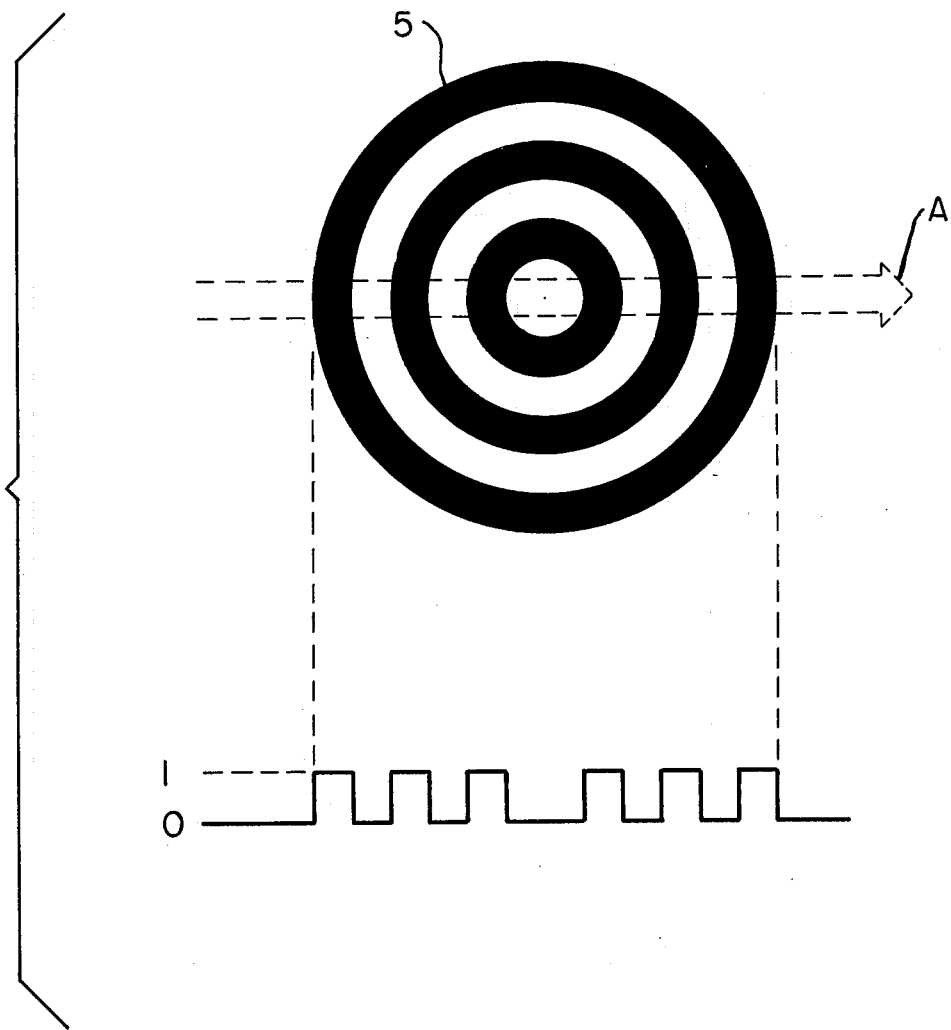
FIG. 7 illustrates one coded section from the FIG. 4 embodiment with a corresponding electrical signal readout.

In FIG. 7, the code mark for the digit value 5 is shown comprised of three dark rings separated by two rings and one center disc of light areas. As a beam is scanned along the path A it produces a pulse corresponding to a one when it sees a dark area and no pulse, corresponding to a zero, when it sees a light area so as to provide the waveform shown. A higher or lower scan of the code mark will result in a variation of the width of the one pulse and in their respective spacings. A comparing means can be provided for comparing the provided pulse waveform against a catalog of known acceptable waveforms so as to reject those waveforms which do not compare favorably. By accepting only those waveforms which correspond to a known waveform, a rejection of all of the scans which do not pass through the center of a code mark is accomplished. Also any waveforms caused by noise or other extraneous marks that might appear on the tag are also eliminated.

Figure 8:
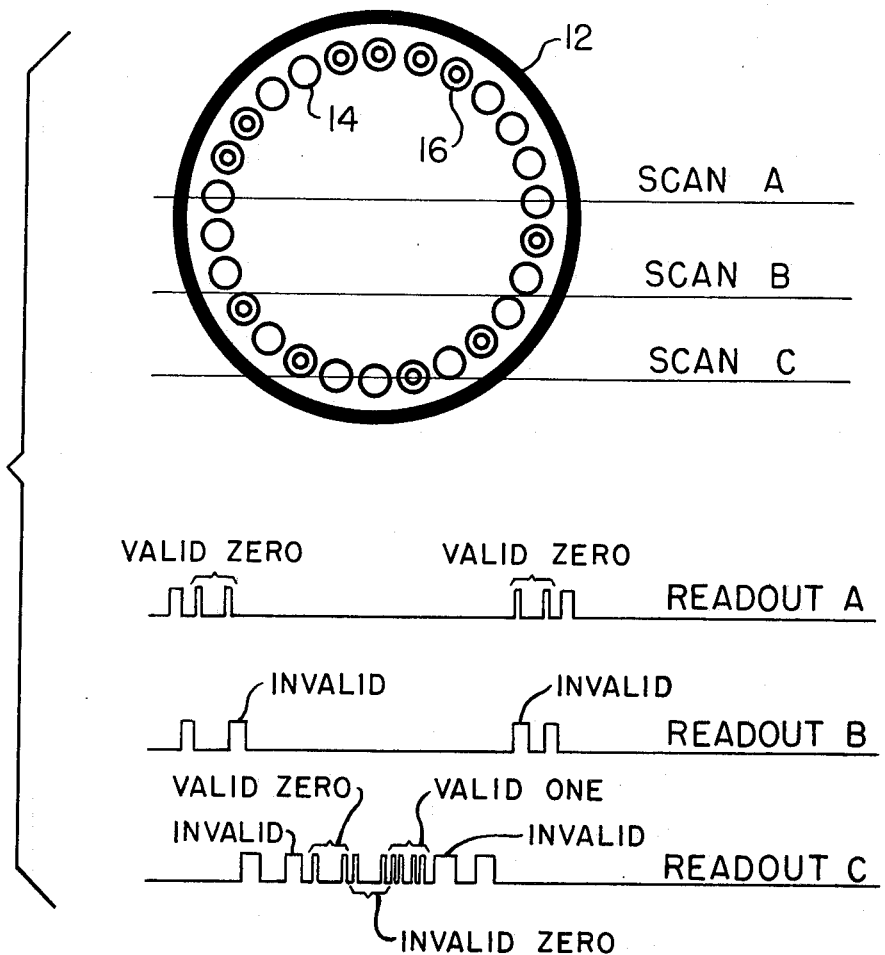
FIG. 8 illustrates the coding used in the FIG. 1 embodiment with electrical signal readouts taken along random paths of scan.

Referring to FIG. 8, the printed tag pattern of FIG. 1 is shown with three example scans, scan A, B and C. The readouts associated with each of these scans are reproduced directly below the tag pattern. Scan A passes directly through the center of two zero marks and therefor provides two pulses of acceptable width and spacing for each zero mark, which pulses are accepted after comparison against known acceptable signals. Scan B does not pass through the center of any code mark, but hits the fringes of two marks. The resultant readout, readout B, does not contain acceptable pulses; therefore the readout signal is rejected. Scan C passes acceptably through a zero and a one mark but unacceptably through a one and two zero marks. The pulse spacing of the labeled invalid zero mark is too close, indicating an off center scan, to be acceptable.

Figure 9:
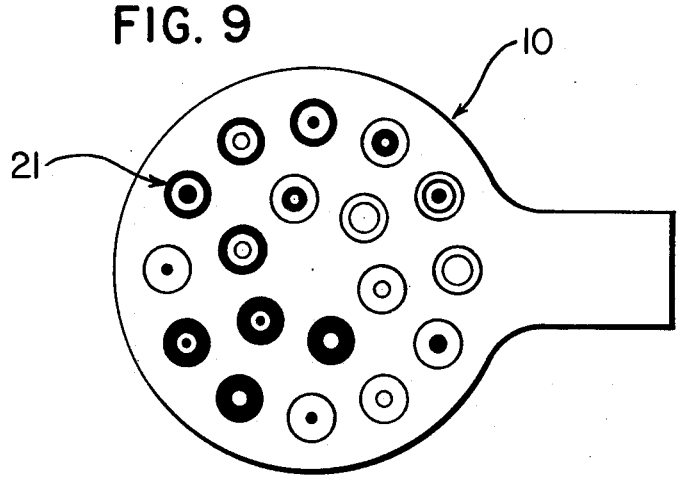
FIG. 9 illustrates a third embodiment of the invention.

Referring now to FIG. 9, another embodiment of the merchandise marking tag 10 is shown with a plurality of concentric circular code marks 21 arranged side-by-side in a circular geometry around the periphery of at least two imaginary circles. The coding and readout of this type of tag may be accomplished by a scanner in a manner similar to the previously described marking tags. The marking tag of FIG. 9 carries more code marks than the tags of FIGS. 1 and 4 and therefore lends itself to use in situations where additional data must be recorded on the same size tag. Additional rings of data may be added to further expand the amount of code data recorded if so desired. The code marks of the present invention need only to be distinguishable from the background onto which they are affixed. Colored ink, magnetic material, or other uniquely reflective materials could be used effectively for the code marks.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A machine readable record medium for storing data and having scannable indicia thereon comprising, in combination:
    a record member for storing data;
    a plurality of individual machine readable circular code marks whose centers lie on the circumference of at least one common circle on said record member, at least one of said circular code marks defining a marker for establishing a unique angular reference position for separating the beginning and the end of said circular code marks.

2. The machine readable record medium according to claim 1 wherein each of said machine readable circular code marks is comprised of at least one ring of a machine readable pattern.

3. The machine readable record medium according to claim 1 and further comprising:
    a second plurality of machine readable circular code marks printed on said tag in at least a second circular geometry concentric with the first named circular geometry.

4. The machine readable record member according to claim 1 and further comprising:
    a circular clocking ring located around the periphery of said plurality of machine readable circular code marks.

5. A machine readable record medium for storing data and having scannable indicia thereon, comprising, in combination:
    a record member adapted to being affixed to an article;
    a plurality of individual machine readable circular code marks arranged side-by-side on said record member in a circular pattern, each of said code marks having at least one ring of a machine readable pattern; and
    marker means for indexing the start and the end of said plurality of individual machine readable circular code marks regardless of the angular orientation of said tag.

6. The machine readable record medium of claim 5 in which each of said individual machine readable code marks includes a plurality of concentric rings.

7. The machine readable record medium according to claim 5 and further comprising:
    a second plurality of code marks positioned in at least a second circular pattern concentric to the first named circular pattern.

8. The machine readable record medium according to claim 5 and further comprising:
    a circular clocking ring located around the periphery of said plurality of machine readable code marks.

9. The machine readable record medium according to claim 5 wherein each of said individual machine readable circular code marks are comprised of concentric rings each of which has either a reflective or an absorbing property.

10. A machine readable record medium particularly adaptable to being affixed to articles of merchandise comprising in combination:
    a record member adapted to being affixed to an article;
    a plurality of individual machine readable circular code marks centered around the circumference of at least one common circle on said record medium.

11. The machine readable record medium according to claim 10 and further comprising:
    a circular clocking ring located around the periphery of said plurality of individual machine readable circular code marks.

12. The method of marking merchandise with a machine readable code comprising:
    affixing a plurality of individual circular code marks to merchandise such that each individual circular code mark has its individual center displaced from a common center; and
    affixing a marker means to said merchandise for indexing the start and the end of said plurality of individual circular code marks.

* * * * *